June 7, 1927.  
L. A. JONES  
ILLUMINATING APPARATUS  
Filed Dec. 19, 1924  
1,631,488  
4 Sheets-Sheet 1
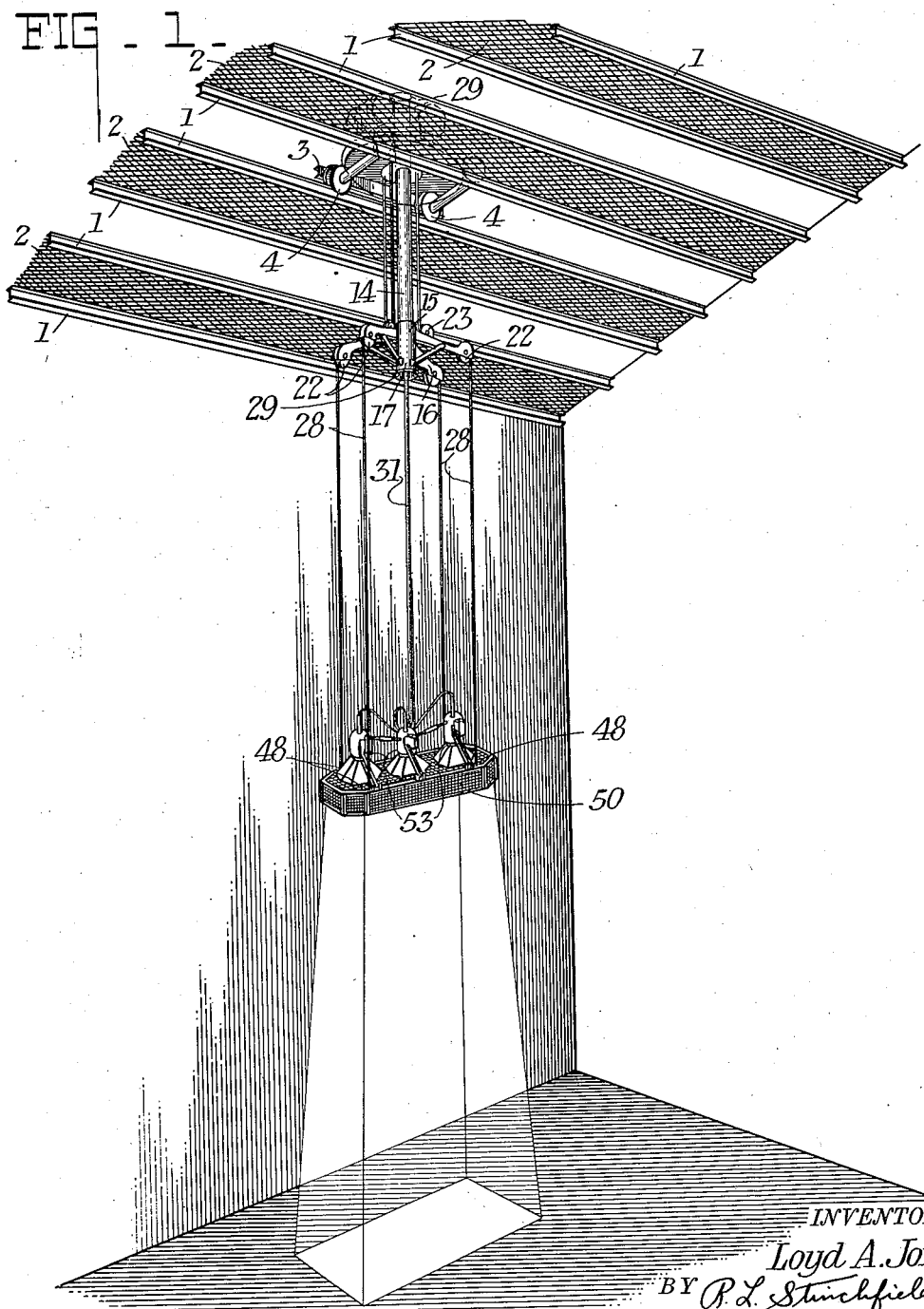

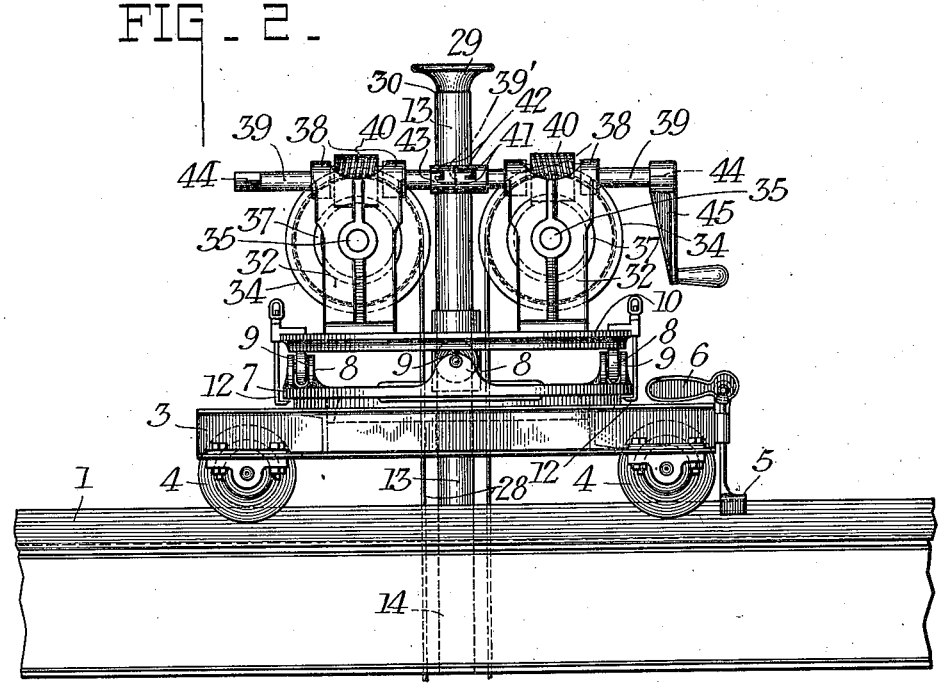
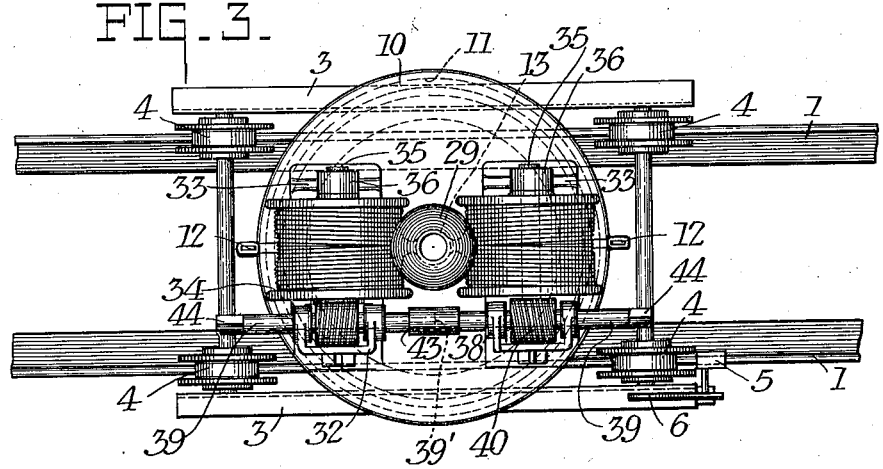

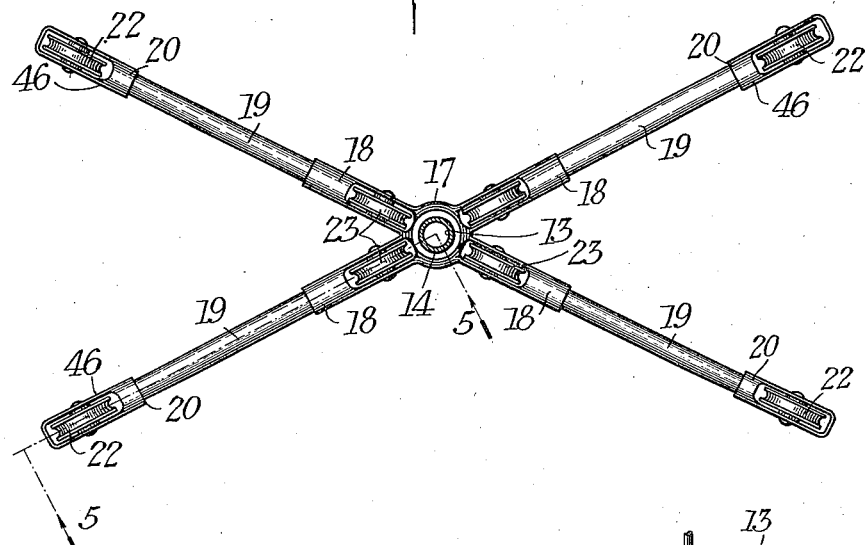
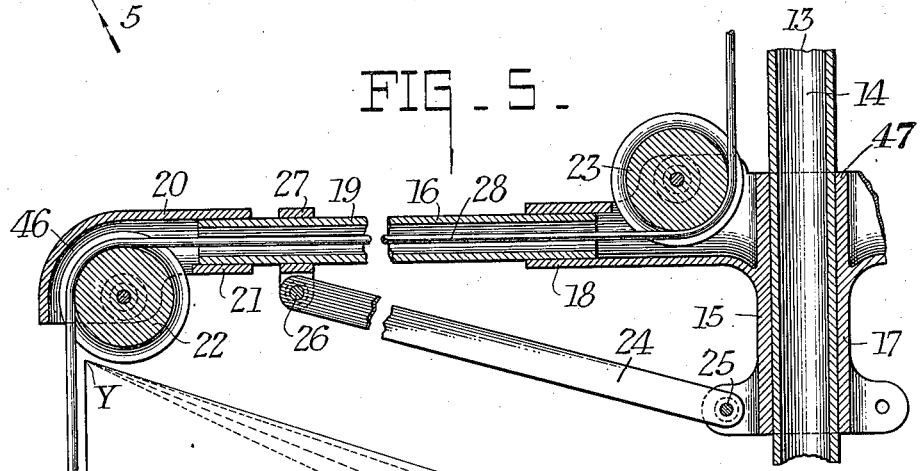

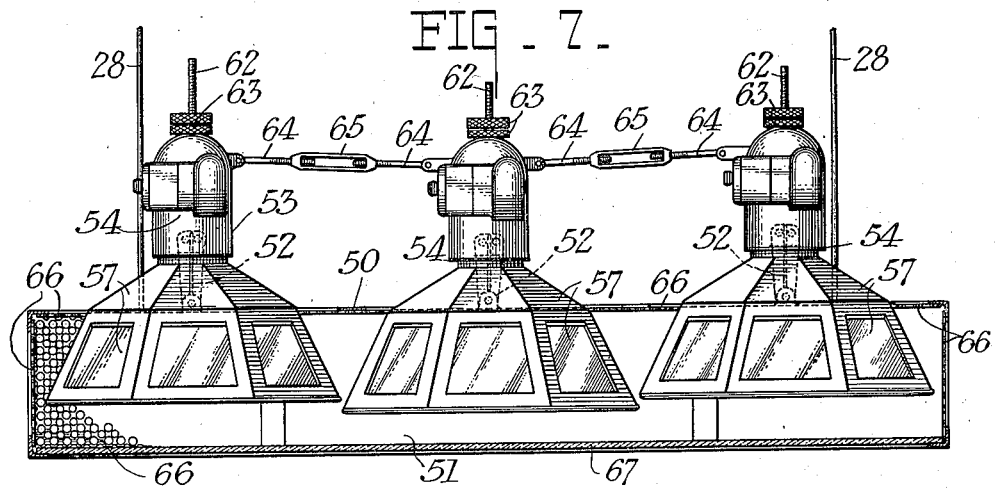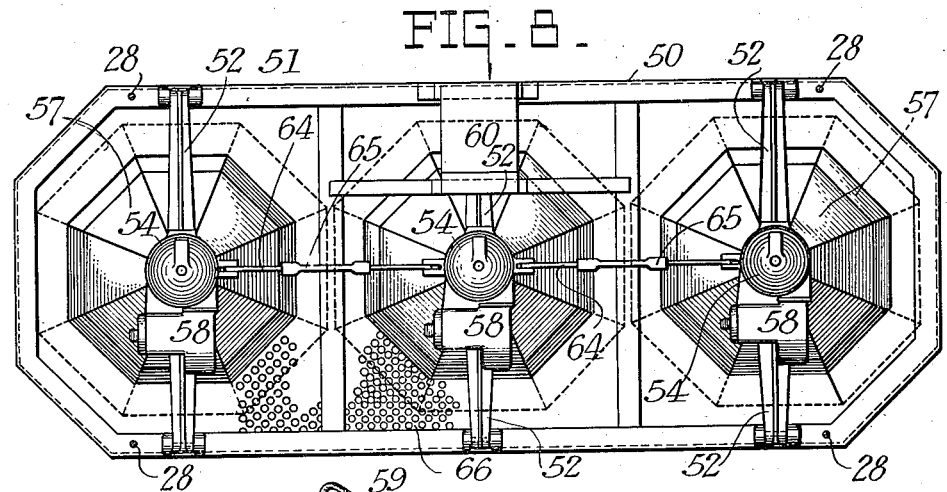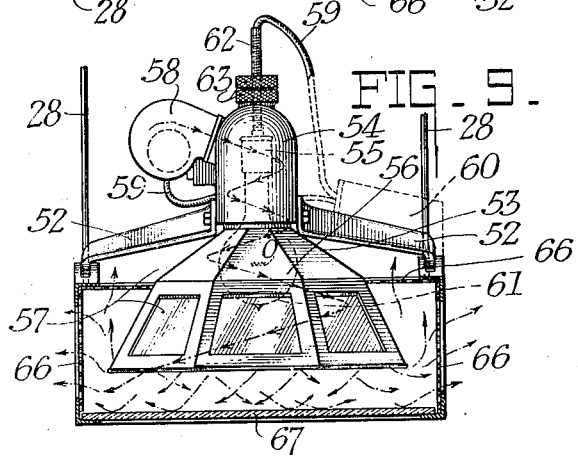

Patented June 7, 1927.

1,631,488

UNITED STATES PATENT OFFICE.

LOYD A. JONES, OF ROCHESTER, NEW YORK, ASSIGNOR TO EASTMAN KODAK COMPANY, OF ROCHESTER, NEW YORK, A CORPORATION OF NEW YORK.

ILLUMINATING APPARATUS.

Application filed December 19, 1924. Serial No. 757,072.

This invention relates to illuminating apparatus and more particularly to such apparatus designed for lighting theater stages and motion picture studios. In taking motion pictures, especially in color, it is desirable to have the illumination under complete control as to direction, evenness and color.

Among the objects of my invention are to provide means for supporting a plurality of units above the scene, to make such units adjustable as to height, inclination, and direction, to so design each unit as to throw an even flood of light upon the area illuminated, and if the unit comprises several light sources to make these relatively adjustable so as to throw their light uniformly upon the selected area.

These and other objects will appear from the following specification, reference being made to the accompanying drawings in which the same reference characters denote the same parts throughout, and in which, Fig. 1 is a perspective view of a portion of a studio showing one illuminating unit in position;

Fig. 2 is a side elevation of the elevated support for a unit;

Fig. 3 is a plan of such a support;

Fig. 4 is a plan of a spider used to guide the supporting cables;

Fig. 5 is a fragmentary section of such a spider on line 5—5 Fig. 4;

Fig. 6 is a diagram used to explain the theory upon which the individual reflectors are designed;

Fig. 7 is a longitudinal section of a lamp carriage showing the individual lamp units in elevation;

Fig. 8 is a plan of a lamp carriage;

Fig. 9 is a cross section of a lamp carriage.

It is customary in theater stages and motion picture studios to have an elevated structure known as a grid and comprising spaced parallel rails upon which are wheeled trucks carrying illuminating units, the space between pairs of rails being filled with a heavy metal net work upon which the attendants walk. Such an arrangement is shown in Fig. 1 where the rails are indicated at 1 and the net work at 2. Upon these rails are trucks of which only one is shown. This has a rigid frame 3 and flanged wheels 4 rolling on the rails 1. A brake 5 operated by the cam lever 6 can be forced into engagement with a rail 1 to hold the truck against accidental movement.

A part of the rigid frame is an annular platform 7 having at equally spaced points on its periphery upwardly extending pairs of projections 8 carrying the rollers 9. A circular platform 10 is mounted to turn on these rollers 9, there being a groove 11 in its lower surface forming a track for the rollers. Guards 12 carried by the platform 10 extend beyond the platform 7 and constitute additional safeguards against displacement.

Centrally of the platform 10 is secured a vertically extending tube or column 13, the lower end 14 of which extends between the tracks 1 and below them and the truck. At its lower end 14, the column carries a spider 15 with four radial arms 16. The spider comprises a central casting 17 surrounding and attached to the column and having tubular projections 18 carrying the tubular members 19 which have at their outer ends the guide members 20. Each member 20 has a tubular part 21 to engage tube 19 and a flanged elbow part 46 carrying a pulley 22. The part 18 is open and flanged upwardly at 47 near the central part of casting 17 and carries pulley 23. Each arm is supported by a brace 24 connected to the casting 17 at 25 and at 26 to a member 27 on the tube 19. Flexible lines 28 by which I mean any suitable cable, rope, or the like, pass over these pulleys as shown in Figs. 1 and 3 from the truck to separated points, 48, preferably near the corners, of the lamp carriage 50. The upper end 30 of the tube extends well above the truck and both ends are flared at 29 for the smooth passage of an electric cable 31 through the tube to the lamp carriage 50.

Upon the platform 10 are pairs of brackets 32 and 33 between which are mounted drums 34 on shafts 35 extending through journals 36 in the brackets. These shafts extend beyond the brackets 33 and carry worm gears 37. The brackets 32 have upwardly extending pairs of projections 38 in which are journaled shafts 39, carrying worms 40 intermeshing with gears 37. These shafts have abutting ends 39' with a clutch connection which in the present embodiment comprises pins 41 carried by the shafts and engageable in bayonet slots 42 in a sleeve 43, which may slide free from engagement with one of the pins. The outer end of each shaft has a squared end 44 for engagement with a suitable operating crank handle 45. The upper ends of two of the lines attached to one end of the illuminating unit pass up through the center of the annular platform 7 and through suitable apertures, not shown, in upper platform 10 and are wound in the same direction around one of the drums, while the other two lines are wound around the other drum. It is obvious that when the shafts are connected and one of them is turned both drums will turn to raise or lower the lamp carriage as a whole, but that when they are disconnected, the turning of one shaft will result in the raising or lowering of only one end or side of the carriage. The carriage may be angularly adjusted by rotating the platform or turntable 10 which supports the drums, 34, tube 13, spider 15 and lamp carriage 50. The height, inclination, and angular position of the lamp carriage may thus be adjusted at will.

The lamp carriage 50 comprises a frame or casing 51, preferably elongated, having a series of pairs of brackets 52 supporting the individual lamp units 53. Each unit comprises an upper housing 54 in the upper part of which is the lamp socket 55. From this housing depends a reflector 56 built of angularly arranged reflecting pieces 57 which will be more fully described hereinafter. On one side of housing 54 near the upper end thereof is a fan unit 58 arranged to direct air at an angle through an aperture in the housing. The air will tend to follow a spiral or helical course through the unit as indicated in Fig. 9 and is very effective in cooling the unit. Separate electrical cables 59 (not shown in Figs. 7 and 8) lead from the fans and lamp sockets to a common assembly box 60, from which the cable 31 leads through tube 13 to a suitable source. The lamp 61 when positioned in the socket 55 will have its filament O positioned in the concavity of the reflector at a point to obtain the maximum efficiency. The lamp socket 55 is on a screw threaded mount 62 and may be adjusted by nuts 63 so as properly to position the filament.

The central lamp unit is fixed in position and the two end ones are tiltable being connected to the central unit by links 64 and turnbuckles 65. They can thus be adjusted so that the flood beams from the several units will diverge or converge as desired.

The frame 51 is a box like structure having all its sides covered with wire netting or foraminous metal sheets 66, which serve to prevent broken pieces of lamp bulb or the like from falling and to absorb heat. I also use a protective sheet 67 of material that is light transmitting but heat absorbing and resistant such as a reinforced glass. This may be tinted if particular color effects are desired. It may be said in explanation of these precautions that very powerful lamps, using several thousand watts apiece, are used and that the heat from these is intense. Every precaution must be taken to protect the players below who may be thinly clad or barefoot from both direct heat and possible breaking bulbs. All the structures described are made of heavy, rugged material.

As noted above, the filament has a particular position at which it evenly illuminates a plane at a definite position from the lamp unit. The relation of these elements will be briefly outlined, reference being made to the diagram in Fig. 6. The concentrated filament or light source is at O and the axis of the system is along the line O—X. The plane YXY' to be illuminated is perpendicular to O—X. Direct rays from the lamp will accordingly fall on the plane in the beam between O Y and O Y'. About the light source is built up a reflector made of series of angularly arranged plane mirrors. The first series A B and A' B' are so placed that they reflect on the plane Y Y' the beams included between the limiting reflected rays O A Y' and O B Y and between O A' Y and O B' Y'. From any point in place Y Y' the light O will appear to be surrounded by a ring of light sources O'. The second series of mirrors are each so dimensioned and positioned as to throw upon plane Y Y' the beams between the limiting rays O C Y and O B Y' and between O B' Y and O C' Y'. From any point of plane Y Y' there is seen a second series of apparent light sources O''. The place for which the reflector is designed is thus evenly illuminated when the filament is properly positioned, the unit furnishing a "flood light" as distinguished from a "spot light" or light brought to a focus on a particular point.

I contemplate as within the scope of my invention all such modifications and equivalents as fall within the appended claims, the construction herein shown and described being a preferred example.

Having thus described my invention, what I claim as new and desire to secure by Letters Patent is:

1. Illuminating apparatus comprising an elevated support, a lamp carriage, a plurality of lines extending from separated points on said lamp carriage to said support whereby said lamp carriage is suspended, independent means for adjusting said lines selectively to vary the inclination of the lamp carriage, and means for connecting said adjusting means whereby the lamp carriage as a whole may be adjusted vertically, said last named means being operative to disconnect the adjusting means.

2. Illuminating apparatus comprising an elevated support, a lamp carriage, a plurality of lines extending from separated points on said lamp carriage to said support whereby said lamp carriage is suspended, means for adjusting said lines selectively to vary the inclination of the lamp carriage, means for connecting said adjusting means whereby the lamp carriage as a whole may be adjusted vertically, and a turntable on said support carrying said adjusting means and rotatably adjustable to vary the angular position of the lamp carriage.

3. Illuminating apparatus comprising an elevated support, a lamp carriage, a plurality of pairs of lines extending up from separated points on said lamp carriage to said support whereby the lamp carriage is suspended, a plurality of drums on said support over each of which a pair of said lines are wound, means for turning each of said drums individually, to wind a pair of lines thereon and means for connecting said turning means whereby all of said drums may be turned together.

4. Illuminating apparatus comprising an elevated support, a lamp carriage, a plurality of pairs of lines extending up from separated points on said lamp carriage to said support whereby the lamp house is suspended, a plurality of drums on said support over each of which a pair of said lines are wound, means for turning each of said drums individually to wind a pair of lines thereon, means for connecting said turning means whereby all of said drums may be turned together, and a turntable on said support carrying all of said drums and rotatably adjustable to vary the angular position of the lamp carriage.

5. Illuminating apparatus comprising an elevated support, a lamp carriage, four lines extending from said support to separated points on the lamp carriage, two drums on the support over each of which two of the lines are wound, two shafts one connected to each drum, means for turning each shaft individually to adjust two lines and thus vary the inclination of the lamp carriage, and a clutch for connecting the two shafts whereby both drums may be turned together to adjust the whole lamp carriage vertically.

6. Illuminating apparatus comprising an elevated support, a vertical column extending down from said support, a plurality of guides carried by said column below said support, a lamp carriage, flexible lines extending up from separated points on said lamp carriage over said guides to the support, and a series of means, one for each line, carried directly on said support for adjusting part or all of said lines to vary the height and inclination of the lamp carriage.

7. Illuminating apparatus comprising an elevated support, a vertical column extending down from said support, a plurality of guides carried by said column below said support, a lamp carriage, flexible lines extending up from separated points on said lamp carriage over said guides to the support, and means carried directly on said support above the guides for adjusting said lines to vary the height and inclination of the lamp carriage, said guides being rotatably adjustable to vary the angular position of the lamp carriage.

8. Illuminating apparatus comprising an elevated support, a turntable carried thereby, a vertical column supported by the turntable and extending beneath the support, a plurality of guides carried by the column below said support, a lamp carriage, flexible lines extending up from separated points on the lamp carriage over said guides to the support, and means carried by the turntable for adjusting said lines to vary the height and inclination of the lamp carriage, said turntable being rotatably adjustable to vary the angular position of the lamp carriage.

9. Illuminating apparatus comprising an elevated support, a vertical column extending downwardly therefrom, a spider with radial arms on said column, guides on the ends of said arms, a lamp carriage, lines connected to separated points of the lamp carriage and extending over said guides to the support and means carried directly on said support above the guides whereby certain only or all of said lines may be adjusted to vary the inclination or height of the lamp carriage.

10. Illuminating apparatus comprising an elevated support, a vertical column extending downwardly therefrom, a spider with radial arms on said column, guides on the ends of said arms, a lamp carriage, lines connected to separated points of the lamp carriage and extending over said guides to the support and means on said support whereby certain only or all of said lines may be adjusted to vary the inclination or height of the lamp carriage, said spider being rotatably adjustable to vary the angular position of the lamp carriage.

11. Illuminating apparatus comprising an elevated support, a turntable angularly adjustable on said support, a vertical column supported by the turntable and extending beneath the support, a plurality of arms extending radially from said column, guides carried by the arms, a lamp carriage, flexible lines extending up from separated points on said lamp carriage over said guides to the support, and means carried by the turntable for adjusting said lines to vary the height and inclination of the lamp carriage, said turntable being rotatable to vary the angular position of the lamp carriage.

12. Illuminating apparatus comprising elevated, spaced, parallel rails, a wheeled truck movable on said rails, a vertical tube carried by said truck and extending down between the rails, a spider carried at the lower end of said tube and comprising four radial arms, pulleys at the inner and outer ends of each arm, a lamp carriage, flexible lines attached to the lamp house at four points and passing over the said pulleys to the truck, means on the truck for adjusting said lines to vary the height and inclination of the lamp carriage, and an electric cable extending from said truck down through said tube to the lamp carriage.

13. Illuminating apparatus comprising elevated, spaced, parallel rails, a wheeled truck movable on said rails, a vertical tube carried by said truck and extending down between the rails, a spider carried at the lower end of said tube and comprising four radial arms, pulleys at the inner and outer ends of each arm, a lamp carriage, flexible lines attached to the lamp house at four points and passing over the said pulleys to the truck, means on the truck for adjusting said lines to vary the height and inclination of the lamp carriage, and an electric cable extending from said truck down through said tube to the lamp carriage, said tube and adjusting means being also rotatably adjustable to vary the angular position of the lamp carriage.

14. Illuminating apparatus comprising elevated, spaced, parallel rails, a wheeled truck movable on said rails, a turntable angularly adjustable on said truck, a vertical tube carried centrally of said turntable and extending down between the rails and beneath the truck, a spider carried at the lower end of the tube and comprising four radial arms, pulleys at the inner and outer ends of said arms, a lamp carriage, four flexible lines connected to the lamp carriage at separated points and passing over said pulleys, two drums carried by said turntable and upon each of which the upper ends of two of the lines are wound, means for turning each of said drums individually, means for connecting said turning means whereby both drums may be turned together, and an electric cable extending from said truck down through said tube to the lamp carriage.

Signed at Rochester, New York, this 15th day of December, 1924.

LOYD A. JONES.